United States Patent
Ibañez Razola (10) Patent No.: US 10,451,964 B2
(45) Date of Patent: Oct. 22, 2019

(54) COMPACT HYBRID DIGITAL-ANALOGUE DEVELOPING MACHINE

(71) Applicant: Pablo Ibañez Razola, Valencia (ES)

(72) Inventor: Pablo Ibañez Razola, Valencia (ES)

( * ) Notice: Subject to any disclaimer, the term of this patent is extended or adjusted under 35 U.S.C. 154(b) by 39 days.

(21) Appl. No.: 15/737,680

(22) PCT Filed: Jun. 22, 2016

(86) PCT No.: PCT/ES2016/070470
§ 371 (c)(1),
(2) Date: Dec. 18, 2017

(87) PCT Pub. No.: WO2016/207463
PCT Pub. Date: Dec. 29, 2016

(65) Prior Publication Data
US 2018/0180983 A1     Jun. 28, 2018

(30) Foreign Application Priority Data
Jun. 24, 2015    (ES) .................................. 201530897

(51) Int. Cl.
*G03B 27/52*     (2006.01)
*G03B 27/46*     (2006.01)
(Continued)

(52) U.S. Cl.
CPC .............. *G03B 27/522* (2013.01); *B41F 5/24* (2013.01); *G02F 1/133512* (2013.01);
(Continued)

(58) Field of Classification Search
CPC ......... G03B 27/522; G03B 27/46; B41F 5/24; H04N 1/00265; H04N 1/00251;
(Continued)

(56) References Cited

U.S. PATENT DOCUMENTS 2,496,947 A    2/1950  Luboshez
4,589,745 A    5/1986  Plummer
(Continued)

FOREIGN PATENT DOCUMENTS

EP    0 274 759 A2    7/1988
EP    0 321 143 A2    6/1989
(Continued)

OTHER PUBLICATIONS

Data sheets (English and Japanese) for Sharp LCD LM64P101, published May 29, 1992.*

*Primary Examiner* — Yaovi M Ameh (57) ABSTRACT

Compact hybrid developing machine that exposes a photosensitive substrate (1) using an LED or LCD display (2,3) wherein the substrate (1) is placed in direct contact with the image generating layer (colour generating layer+channelling layer) of the display (2,3). When the display is of LCD technology, the filters (21) of the colour generating layer are placed closer to the substrate (1) than the liquid crystal layer (22). In both types of display (2,3), a channelling layer is installed within the image generating layer, for example, a black matrix (4) of opaque elements. When using an LCD display (2), this may have a unifying filter (24) or a black translucent filter (25) before the light diffusing layer.

15 Claims, 5 Drawing Sheets

(51) Int. Cl.
  *H04N 1/23* (2006.01)
  *B41F 5/24* (2006.01)
  *G02F 1/1335* (2006.01)
  *H04N 1/00* (2006.01)
  *H04N 5/232* (2006.01)
  *G03G 15/22* (2006.01)
  *G03G 15/00* (2006.01)

(52) U.S. Cl.
  CPC ....... *G02F 1/133514* (2013.01); *G03B 27/46* (2013.01); *G03G 15/225* (2013.01); *G03G 15/6517* (2013.01); *H04N 1/00129* (2013.01); *H04N 1/00251* (2013.01); *H04N 1/00265* (2013.01); *H04N 1/23* (2013.01); *H04N 5/23293* (2013.01)

(58) Field of Classification Search
  CPC .. H04N 1/00129; H04N 1/23; H04N 5/23293; G02F 1/133514; G02F 1/133512; G02F 1/13; G02F 1/136209; G03G 15/06; G03G 15/6517; G03G 15/225; B41J 2/45; B41J 2/447; B41J 2/4473; B41J 2/475
  See application file for complete search history.

(56) References Cited

U.S. PATENT DOCUMENTS

| | | | | |
|---|---|---|---|---|
| 4,605,972 | A | | 8/1986 | Hatanaka |
| 4,782,348 | A | * | 11/1988 | Siegner ................ G02F 1/1333 347/224 |
| 5,081,004 | A | * | 1/1992 | Vinouze ............ G02F 1/136209 430/311 |
| 5,223,960 | A | * | 6/1993 | Kim ....................... H04N 1/036 349/106 |
| 5,337,068 | A | * | 8/1994 | Stewart .................. G09G 3/342 345/102 |
| 5,739,896 | A | * | 4/1998 | Patton .................... G03B 27/32 355/27 |
| 5,742,365 | A | * | 4/1998 | Seo ........................ G02F 1/1368 349/43 |
| 5,760,882 | A | * | 6/1998 | Gulick, Jr. ............. G03B 27/16 355/125 |
| 5,860,036 | A | * | 1/1999 | Stephenson ............... H04N 9/73 348/E9.051 |
| 5,899,594 | A | | 5/1999 | Piccinino, Jr. |
| 6,288,788 | B1 | * | 9/2001 | Stephenson ............ H04N 1/508 355/78 |
| 2002/0067440 | A1 | * | 6/2002 | Chino ...................... B41J 2/445 349/2 |
| 2004/0179088 | A1 | | 9/2004 | Wong |
| 2005/0168671 | A1 | | 8/2005 | Lee |
| 2005/0248699 | A1 | | 11/2005 | Li |

FOREIGN PATENT DOCUMENTS

| | | |
|---|---|---|
| EP | 0 512 924 A2 | 11/1992 |
| EP | 0818919 | 1/1998 |
| GB | 2239216 | 6/1991 |

* cited by examiner

COMPACT HYBRID DIGITAL-ANALOGUE DEVELOPING MACHINE

CROSS REFERENCE TO RELATED APPLICATIONS

This application claims priority to the following Patent Application: (1) PCT application PCT/ES2016/070470, filed Jun. 22, 2016; and (2) Spanish patent application P201530897, filed Jun. 24, 2015. The above-identified applications are hereby incorporated by reference in entirety as if fully forth herein.

TECHNICAL FIELD

This invention refers to a hybrid digital-analogue developing machine that, starting from an image in digital format, excites a photosensitive substrate for subsequent processing by developing or flexography.

STATE OF THE ART

One of the main drawbacks in printing digital photographs is the current high cost of inkjet printer ink that is often several times the price of analogue developing liquids. Furthermore, the higher the quality required, the higher is the amount of ink used in the inkjet system and therefore the higher the cost.

In addition, the ability to faithfully reproduce the colour gamut is lower as the inkjet technology deposits small dots of various colours that generate a more limited colour gamut than analogue technology, where the layers of cyan, yellow and magenta can be superimposed in a myriad of shades, reproducing a very high colour gamut.

Although the resolution of inkjet machines in high-quality printers exceeds 500 dots per centimetre, it remains very inferior to the result of obtaining images by chemical or analogue developing, which could be considered to be infinite as the same surface is fully occupied by the colour and not by discrete dots.

Another drawback of the inkjet system for photographs is their duration, which in terms of quality will fade at a faster rate than photographs developed chemically. It goes without saying that the water-based dyes of the majority of home inkjet printers are only suitable for interiors and must be protected with protective films if they are to be displayed outside.

U.S. Pat. No. 5,739,896 reveals a machine that uses an LED to excite photosensitive substrate for its subsequent development. This expensive, slow and complex system forces the substrate to be separated from the LED emitter that moves across the surface of the substrate, maintained by suction against a support. Because of this distance, the light emitted by the LED opens out and does not exactly shine on the dot, which causes a loss of sharpness, giving the image a blurred appearance (which therefore requires a specific focuser)

Also, U.S. Pat. No. 4,605,972 reveals a system that exposes a photosensitive substrate using a light source with interchangeable colour filters and an LCD display that selects the parts excited by each colours. This system is equally slow and the separation between the dot where the colour is generated and the substrate also causes a loss of sharpness.

The applicant is not aware of any solution that exposes a substrate rapidly from a digital image, maintaining high quality and without any separation between the photosensitive substrate and the image generating layer of the light-emitting display, that has the high density of pixels that would permit the expected image sharpness.

BRIEF DESCRIPTION OF THE INVENTION

The machine consists of a compact hybrid developing machine, according to the claims, that in its various embodiments beneficially resolves the problems of the state of the art.

The invention unites the advantages of chemically developed images and digital technology, transforming what was previously an analogue celluloid negative into a digital display, which exposes the image displayed on the display by contact with a photosensitive substrate and subsequently develops the substrate by chemical treatment. The treatment will depend on the type of process in which it is applied.

The advantages of this machine are obvious:
Resolution or colour density per unit surface area is considerably higher than in inkjet processes.
Versatility in the treatment of any digital image, which can be modified digitally. Using a digital image enables adjusting the output colour of the positive image, because the colour of the pixels can be changed at will to obtain the desired colour; specifically, the "negative" of the photograph can be changed, which was previously impossible before digital technology.
Cost of the supplies.
Improvement of the production ratio (in $m^2/h$) compared to the inkjet system.
Versatility in the type of substrate, with the possibility of using a flat or curved substrate.
In various embodiments, the facility for working with large sizes.
Useful life of the produced photograph, which can be some 100 years.

The machine is composed of two main sections, first section where the image is exposed by direct contact with the LCD or LED (OLED, AMOLED or any system with similar thickness) display photosensitive substrate, and a second development or treatment section, that will depend on the process in which it is applied: developing in a single stage, that is instantaneous, or in 3 different stages flexography, etc. The display can show the image in positive or negative, depending on the type of substrate and the processing.

The compact hybrid developing machine of the invention is of the type that exposes a photosensitive substrate using an LED or LCD display, with the particularity that the substrate is placed in direct contact with the image generating layer of the display. This image generating layer is defined as the layer through which the light emerges, after crossing it, coloured in RGB and with the light intensity required to excite the substrate, in addition to the corresponding channelling.

It is important to highlight that the RGB filter must have a pigment density such that when the light passes through it, the resulting spectrum is as close as possible to each R, G and B colour, so avoiding "peaks" of the spectrum in unwanted colours.

That is, the invention does not have optical concentrators of the light beam between the display and substrate and places the image generating layer as close to the substrate as possible (in working position and exposure) so that there is no lateral light diffusion and therefore this prevents the fuzziness in the developed substrate.

In order to achieve this, when the technology is LCD, the colour generating layer is located between the liquid crystal layer and the substrate, either before or after the polarizing layer. The closeness to the substrate is improved by adding pixel channeling components, generally in the form of a black matrix.

These channelling components ensure that the substrate layers are excited homogeneously, clearly marking the pixel borders.

In the case of LCD displays, it is recommended not to put the polarizing filter between this image generating layer and the substrate as this could "eliminate" the channelling effect of the light.

In this type of display, LCD, it would be beneficial to have a black translucent filter or a unifying filter prior to the light diffusing stage (standard in these types of displays), the first to prevent an excess of light intensity in exposure and the second to homogenise the source light spectrum.

If an effective unifying filter that gives a pure R, G, B spectrum as a result is not used, it would be useful to add another type of filter that adjusts the resulting spectrum to prevent colour aberrations in the photosensitive substrate, such as the red, magenta, yellow or cyan filters used in traditional photography to adjust the colour.

In the case of LCD displays, the polarizing filter that regulates the intensity of the light reaching the photosensitive substrate can be before or after the RGB filter, although the result will not be optimal in the latter case because the distance between the RGB filter and the substrate is increased by a few microns and consequently the light will not be channelled correctly and the resulting image lose sharpness.

When the display is LED technology (OLED, AMOLED), the diodes will initially be located close to the substrate in working position and exposure) because this is much thinner than the corresponding LCD technology. In addition, filters that attenuate the light intensity are not required because the intensity can be directly attenuated by using the LED display controller.

LED technology provides an advantage compared to that of LCD in that the black colour of the pixels (corresponding to a pure white in positive) is totally black because the RGB LEDs of each black pixel remain switched off and do not produce any exposure in the photosensitive substrate.

The LED display can be flexible and be included in a rotating roller.

For large substrates or to reduce the size and price of the displays, the substrate can be exposed by several displays with a total width that covers the total width of the substrate, or at least the part that is to be exposed. Each display will expose a different part of the substrate. This solution is compatible with its application via rollers.

In the case of application of LED displays in two or more rollers, these may occupy only a fraction of the exterior surface, so that the whole substrate surface to be activated is exposed by all the displays acting together.

As an example of the image channelling layer, a black matrix of opaque elements can be situated surrounding each pixel or each colour generating element (diode or filter), placed in the colour generating layer, in a layer closer to the substrate, or both. If the black matrix has the proper size, it will additionally make the end-point colours purer (either white or black depending on the image displayed in positive or negative) because the light will not reach the neighbouring pixels. When the black matrix is placed both on the pixel borders and between the colour generating elements, it will be preferably longer in the pixel borders.

The machine can be complemented with a developing equipment, or use a self-developing substrate (such as that used by Polaroid cameras) that comprise frangible sealed compartments containing the developing liquids. In this second case, it would be beneficial to take advantage of the small size to include a photographic camera and convert the machine into a modern and improved version of the above cameras.

The machine can also be used in a flexography application. In this case, the substrate will be transported to a suitable station and the steps of a flexographic process performed, which do not need to be described as they are known in the state of the art.

The last and most external layer, in both types of displays is a protective layer, which is the layer that will be in physical contact with the photosensitive substrate. Depending on the risk of friction with the substrate, it would be possible to remove it, given that the display is not accessible from the outside.

DESCRIPTION OF THE FIGURES

The following figures are included in order to give a better understanding of the invention.

EXAMPLES OF EMBODIMENTS OF THE INVENTION

One method of embodiment and a non-limiting illustrative example of the invention is briefly described below.

The machine of the invention is composed of a section for exposing a photosensitive substrate, which is later treated, inside or outside the machine, depending on the process that is being applied.

The beneficial part of the invention is the requirement of direct contact between the substrate (1) and the digital exposure display (2,3), more specifically of the image generating layer of the display (2,3), that is, the part of the display (2,3) that is generating the colour (colour generating layer) for the corresponding pixel and its channelling elements. This is the part that confers the qualification of compact to the assembly.

In the case of an LCD display (2), this implies that the colour generating layer that corresponds to the RGB colour filters (21) of each pixel is located "downstream" from the liquid crystal layer (22), that is, closer to the substrate (1), including the layers (22') between which the electrical charge is generated, generally of the material called indium tin oxide (ITO).

In the case of an LED display (3), the position is less relevant given that the thickness of LED displays (3) with OLED or AMOLED technology is considerably less.

As part of the requirement for direct contact, the machine cannot have an optical element such as a lens or similar that does not form part of the display (2,3). An example of these unnecessary elements would be the lens that is described in column 3, line 67, to column 4, line 8 of the previously mentioned document U.S. Pat. No. 5,739,896.

Figure 1:
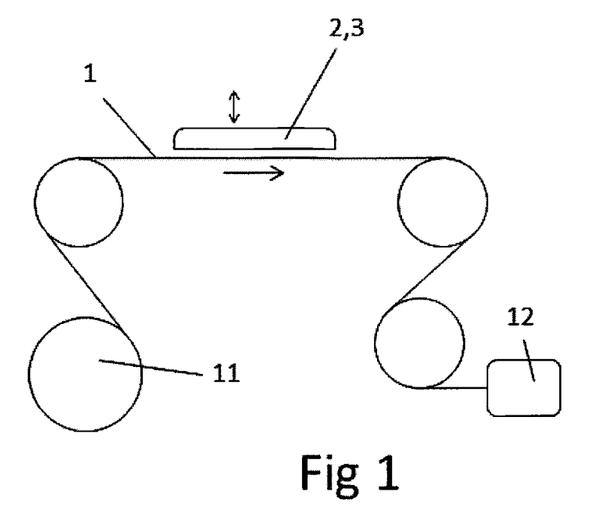
FIG. 1: schema of a compact hybrid developing machine according to an example of embodiment.

In the case of LCD displays (2), the RGB colour filters (21) of each pixel can be placed before or after the corresponding polarizing layer (23) after the liquid crystal layer (22). It is not necessary to apply a protective layer (26) or a thin layer could be applied, on the more external part, because if the machine is set with a certain to and fro motion between the substrate (1) and the display (2,3) (FIG. 1), there will not be any friction but only perpendicular contact when the substrate (1) is exposed.

Figure 2A:
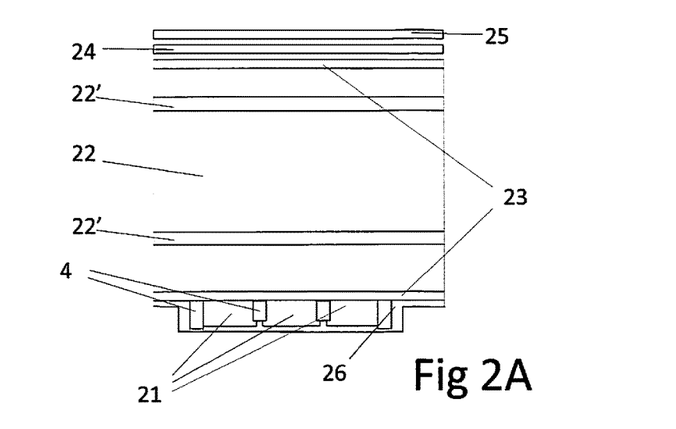
FIGS. 2A, 2B and 2C: schematic sections of LCD displays according to both examples of embodiment.
Figure 2B:
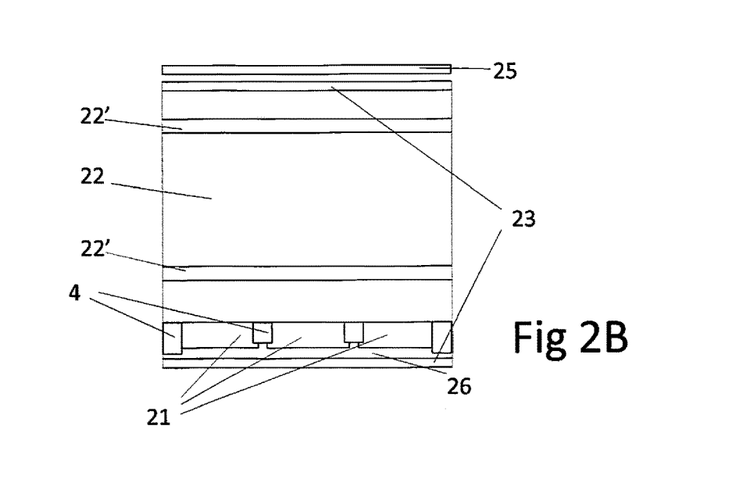
Figure 2C:
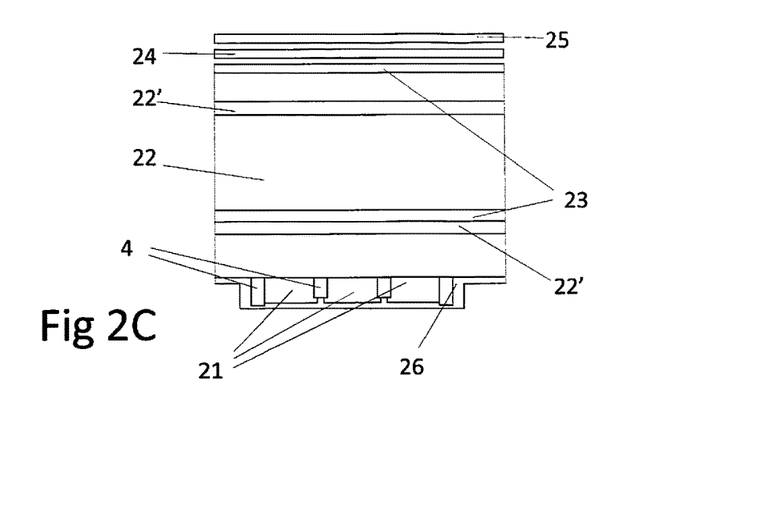
Figure 3:
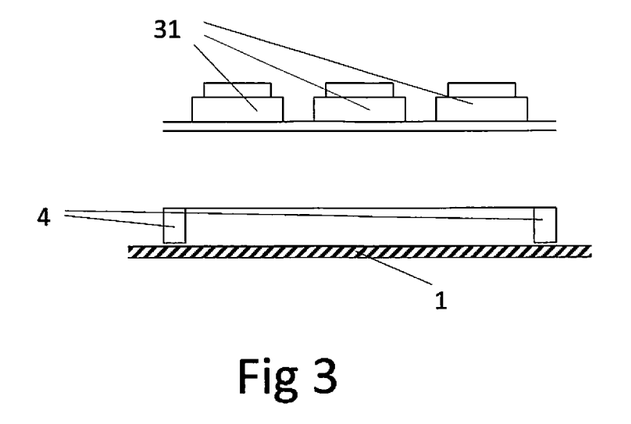
FIG. 3: schematic section of an LED display according to an example of embodiment.

It is advisable that the colour generating layer be located after the external polarizing layer. In this way, firstly, the light will change its intensity at each dot (effect of the external polarizing filter) and then will be "coloured" (effect of the colour filter) and not the other way round. The image will be formed on the more external layer of the display and will be in contact with the substrate (1). Specifically, for the purposes of assembly, the RGB colour filters (21) of each pixel will be fixed on the more external crystal of the display. They may be fixed over the polarizing layer (23) or the current external polarizing layer (23) can be exchanged with the internal filters (21) and thus both will be adhered to the crystal (FIG. 2C).

The exposure of the substrate (1) is automatically controlled in light intensity and time by the application that manages the display (2,3), so that at the end of the exposure, the image of the display (2,3) disappears and as a result leaves exposed the image to be developed.

Starting from this solution, which improves the sharpness of the image projected on the substrate (1), a series of modifications can be made depending on the type of processing to be performed.

The preferred form of channelling the elements is a black matrix (4), formed by lines of opaque material between the filters (21) or diodes (31) or "downstream" of them, but without coming into contact with the substrate (1). This black matrix (4) ensures the sharpness of the image formed by the channelling layer. In addition, it will allow "distancing" the colour generating layer from the substrate.

Figure 4:
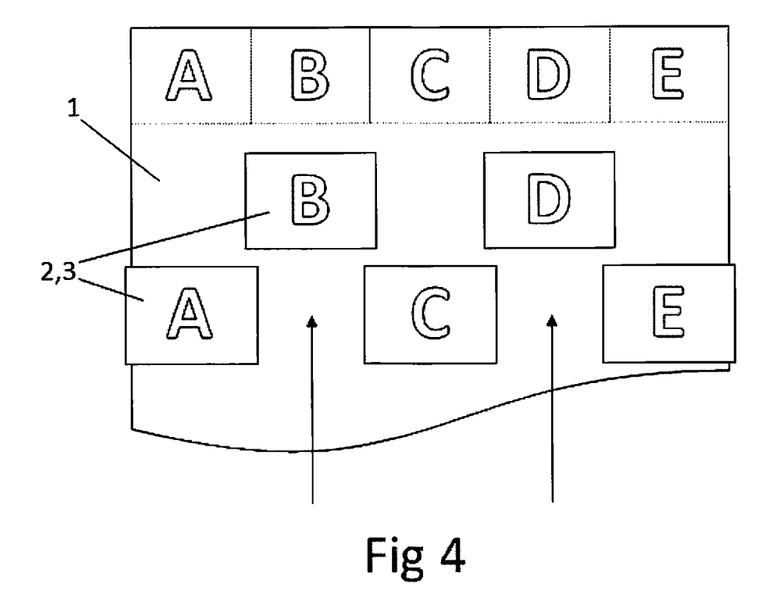
FIG. 4: schematic view of a large size substrate and its exposure via several displays in parallel, according to one form of embodiment.
Figure 6:
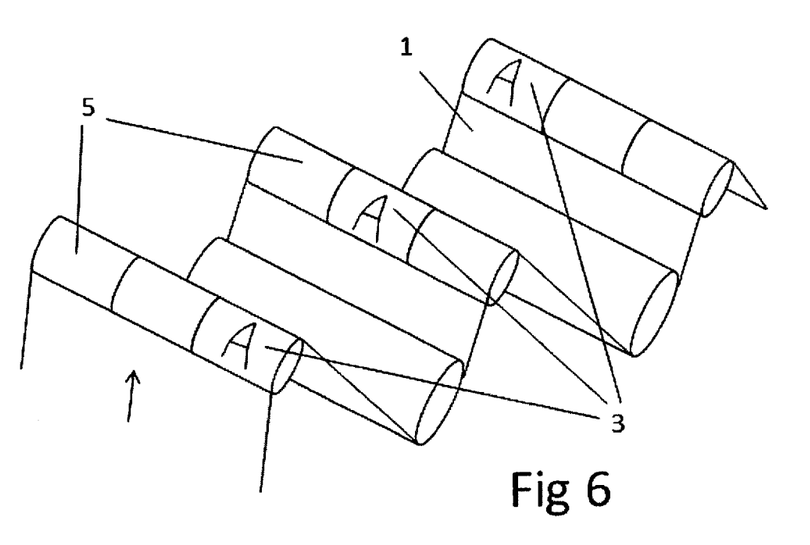
FIG. 6: schematic view of several rollers in series to consecutively expose parts of the substrate.

The following modification corresponds to using various displays (2,3) in series, as shown in FIGS. 4 and 6, so that exposure of large substrates (1) can be performed without needing displays (2,3) of the same dimensions.

Figure 5:
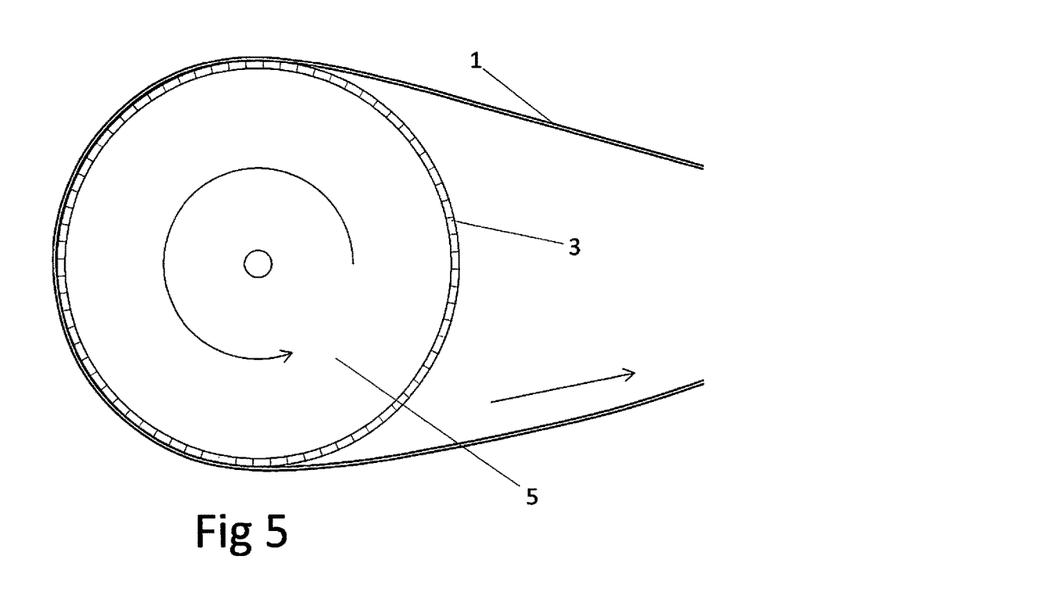
FIG. 5: schematic section of a roller with the functions of an LED display.

The existence of flexible LED display (3) variants enables performing the exposure of the substrate (1) by one LED display (3) in the form of a roller (5) (FIG. 5). In this type of configuration, the substrate (1) "wraps" the roller (5), and as the roller rotates and new substrate (1) comes into contact with it, the LED display (3) continues adding image lines digitally, ensuring that the substrate (1) in contact with the LED display (3) has sufficient time to be exposed, after which the digital image lines switch off and the substrate (1) separates from the roller (5) to allow another section of the substrate to come in. The use of rollers (5) is particularly useful in continuous processes where stop-go systems will not be required in the machine.

Figure 7:
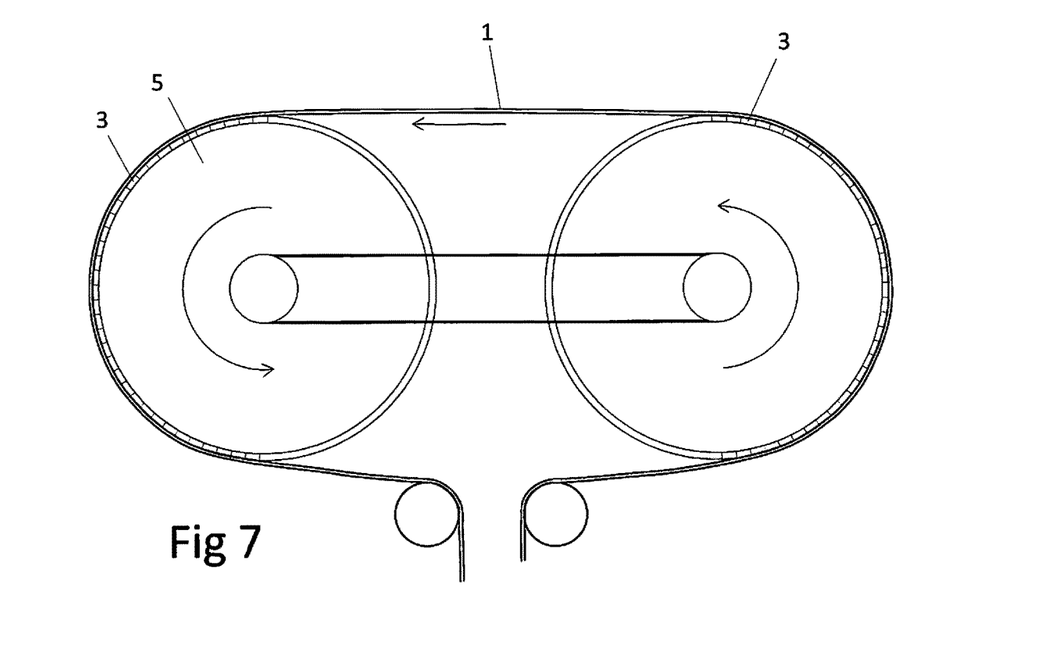
FIG. 7: schematic lateral view of two rollers exposing different parts of a same figure on the substrate, according to an example of embodiment.

Applying LED displays (3) in the form of a roller (5) is compatible with having LED displays (3) in series, as shown in FIG. 6 (in which the substrate (1) has been shown as transparent in order to facilitate the view of the rollers (5)). In addition, the rollers (5) do not need to have LEDs on the whole surface, only on a part (FIG. 7), so that the substrate (1) is exposed discontinuously on one roller (5) before passing to the next where the remaining part is exposed. This latter variant requires great precision in the coordinated rotation of the rollers (5) and proper calibration of the starting and ending points of exposure of the lines of pixels.

There are various ways of making LED displays (3) so that each pixel is produced by a series of adjacent LEDs (one of each colour or of a fixed colour with the corresponding set of filters to modify it) or by superimposed LEDs ("stacked OLED"). This latter technology is preferred as it gives greater resolution. When the LEDs are of a fixed colour (generally white) and filters are placed after them, they may be arranged "downstream" of the corresponding anode, bringing them closer to the substrate (1).

In the case of LCD displays (2), the light spectrum of the back or side illumination should be controlled to ensure that it is reasonably uniform. For example, when the light source is fluorescent or a white LED, the red spectrum is very low. Therefore it is advisable to include a spectrum unifying filter (24) before the filters (21). Specifically, they may be one or more of the following;

Tricolour: a film with the three RGB colors, spread over different areas of the pixel. The relative surface areas will depend on the intensity of the light they must transmit the larger the area, the higher percentage of original intensity that they pass.

Red, as this is the colour that is least present in fluorescent or white LED light.

Magenta or yellow: to compensate for the sensitivity of certain substrates (1).

The spectrum unifying filter (24) is dispensable when the light source or the substrate (1) are adequate, or when the filters (21) are sufficiently dense in pigments. When the unifying filter is present, it will be located before the light diffusing stage, so that the light source of origin is a mixture of RGB of equal intensity.

Similarly, to reduce the intensity of the light that reaches the substrate (1), a black translucent filter (25) can be included. This can prevent excess exposure and in turn, provides purer blacks in the final image (or whites depending on whether the image is displayed in positive or negative).

Both the unifying filter (24) and the black translucent filter (25), or any other filter that is present, will preferably occupy the whole surface of the LCD display (2) to prevent escapes of unfiltered reflected light.

In any case, once the LCD display (2) has been adjusted with appropriate filters, because each type of substrate (1) that has been treated to be photosensitive may have a tendency to favour one or other colour, any digital photography software can modify the tones of the digital photograph and act as a "digital filter", even only on those areas of the photograph where this may be required.

If the LCD display (2) is backlit by white LEDs, these can be replaced by a matrix of RGB LEDs and the rear unifying filter (24) that balances the light spectrum removed.

The invention is applicable in various different structures with or without developing equipment forming an integral part of them. In the standard embodiment, the machine can be complemented with a developing equipment where the developing liquids may be applied with sponges, sprays or by immersion. These will correspond to the type of developing desired, black and white or colour.

The photosensitive substrate (1) is conducted by rollers or other transporting system from its using (11) to a space in which the sensitive part of the substrate (1) enters into direct contact with the digital display (2,3), which will reproduce the displayed photograph in positive or negative, so that the negative-positive or positive-positive size ratio is 1:1. From there, the transport continues to the developing equipment (12).

Figure 8A:
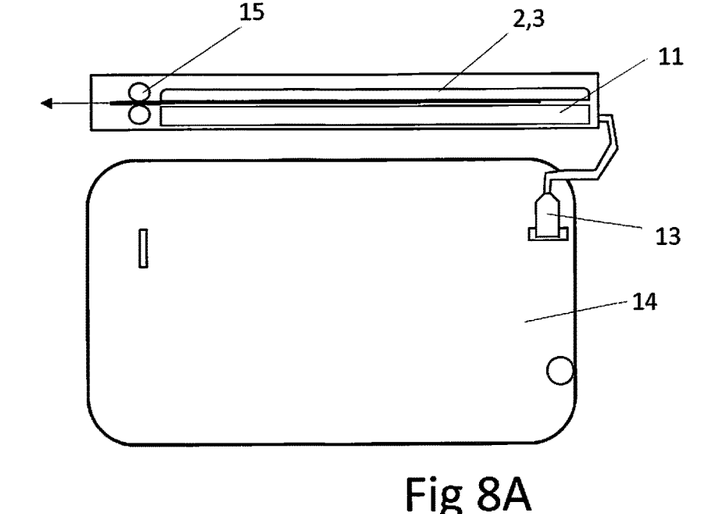
FIGS. 8A and 8B: two examples of embodiment of the machine in its complete form.

One option is to have a USB connector (13), of the current standard or with a converter cable, for connection to a Smartphone (14) and the corresponding computer program running on it as a "app" in the current language (FIG. 8A). The developing system will be any appropriate developing system.

Figure 8B:
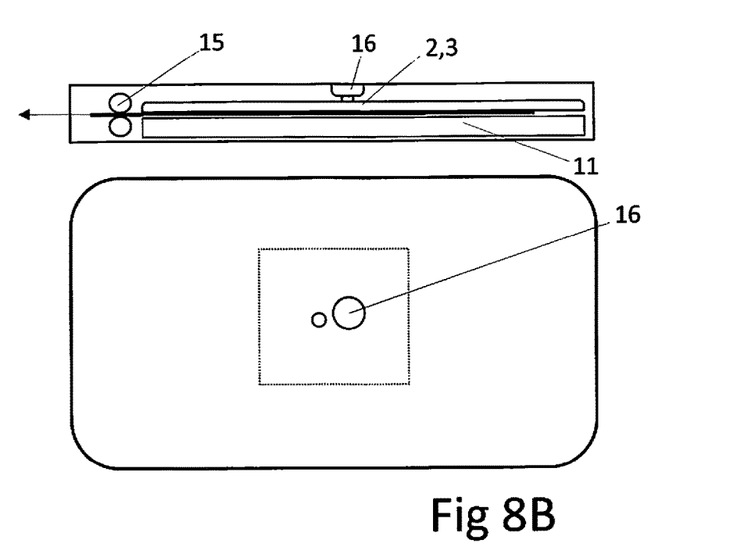

A more complex solution (FIG. 8B) comprises a self-developing substrate (1) that contains the liquids that develop the image in frangible sealed compartments contained in layers of the substrate (1) itself. When the substrate (1) is directed to pressure rollers (15) that break the compartments, the liquids will spread and mix, causing the developing to take place. This variant can be complemented with its own digital photographic camera (16). In this way, the machine will take and develop instantaneous photographs such as the traditional Polaroid cameras, no longer marketed, that used to use this type of substrate (1).

The invention claimed is:

1. A compact hybrid digital-analogue developing machine that comprises:
   a photosensitive substrate;
   an OLED or AMOLED type LED display or LCD display that comprises an image generating layer;
   wherein the photosensitive substrate is exposed by the OLED or AMOLED type LED display or the LCD display and placed in direct contact with the image generating layer;
   wherein the image generating layer comprises a colour generating layer and a light channelling layer;
   wherein the colour generating layer comprises colour generating elements; and
   wherein the light channelling layer comprises channelling opaque elements that surround each colour generating element of the colour generating elements, the light channelling layer being placed beneath the colour generating layer.

2. The machine of claim 1, wherein the display is a LCD display and the colour generating elements are filters that are placed closer to the substrate than the liquid crystal layer.

3. The machine of claim 2, wherein the filters are placed between a polarizing layer and the liquid crystal layer.

4. The machine of claim 2, wherein the filters are placed between a polarizing layer and the substrate.

5. The machine of claim 2 further comprising a black translucent filter before the liquid crystal layer.

6. The machine of claim 2 further comprising a spectrum unifying filter before a light diffusing stage.

7. The machine of claim 6, wherein the spectrum unifying filter is selected from:
   A tricolour film, with the RGB colours, spread over different areas of the pixel and whose surface areas are proportional to the percentage of the original intensity of each colour they should allow to pass through;
   A red, magenta or yellow film.

8. The machine of claim 1 wherein the display is at least one LED display that forms part of a revolving roller.

9. The machine of claim 8 further comprising at least two LED displays on a pair of rollers and wherein each LED display occupies a fraction of the external surface area of the corresponding roller.

10. The machine of claim 1, wherein the LED display comprises LEDs with a source of monochrome colour and filters are placed closer to the substrate than to a LED anode.

11. The machine of claim 1 further comprising several displays with a total useful width that covers the total width of the substrate, and configured so that each display exposes a different part of the substrate.

12. The machine of claim 1 further comprising equipment to develop the substrate.

13. The machine of claim 1 wherein the substrate comprises frangible sealed compartments with developing liquids inside.

14. The machine of claim 13 further comprising a photographic camera.

15. The machine of claim 1, wherein the substrate is used in a flexographic process.

* * * * *